US007448669B2

(12) United States Patent
Legon

(10) Patent No.: US 7,448,669 B2
(45) Date of Patent: Nov. 11, 2008

(54) MECHANISM FOR OPENING A CLOSURE

(75) Inventor: Jason Edward Legon, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 11/672,820

(22) Filed: Feb. 8, 2007

(65) Prior Publication Data

US 2007/0187987 A1 Aug. 16, 2007

(30) Foreign Application Priority Data

Feb. 10, 2006 (GB) ................................ 0602724.7

(51) Int. Cl.
*B60J 5/00* (2006.01)

(52) U.S. Cl. ................................................... 296/146.4

(58) Field of Classification Search ............... 296/146.4
See application file for complete search history.

(56) References Cited

U.S. PATENT DOCUMENTS 2,720,676 A 10/1955 Vigmostad
3,421,379 A * 1/1969 Carroll .......................... 74/44
5,535,551 A * 7/1996 Falk et al. ...................... 49/324
5,544,388 A 8/1996 Chiura
6,044,587 A * 4/2000 Vetter et al. ................... 49/324
6,367,123 B1 4/2002 Cheal et al.
6,516,567 B1 2/2003 Stone et al.
2004/0124662 A1 7/2004 Cleland et al.
2005/0017224 A1 1/2005 Salice
2005/0264029 A1 12/2005 Bodner
2006/0125283 A1* 6/2006 Guler ...................... 296/146.4

* cited by examiner

*Primary Examiner*—Dennis H Pedder
(74) *Attorney, Agent, or Firm*—Dickinson Wright PLLC; Greg Brown

(57) ABSTRACT

An actuator assembly (10) for pivoting a closure (29), such as a tailgate, includes an actuator (11), a first bar (20), a second bar (22), and an operating strut (21) operably connected to the closure (29). The actuator (11) includes an actuator rod (16) reciprocable along a longitudinal axis (L-L). The first bar (20) has one end connected via a first pivot (18) to an outer end of the actuator rod (16) and the other end connected via a second pivot (19) to the operating strut (21). The second bar (22) is pivoted at one end relative to the actuator (11) by a third pivot (24) and the other end connected to said first bar (20) by a fourth pivot (23). The first, second, third and fourth pivots (18, 19, 23, 24) have a series of substantially parallel axes that are orthogonal to the longitudinal axis (L-L) of the actuator rod (16).

15 Claims, 4 Drawing Sheets

MECHANISM FOR OPENING A CLOSURE

CROSS-REFERENCE TO RELATED APPLICATION

This application claims the benefit of United Kingdom Application Serial No. GB0602724.7, filed on Feb. 10, 2006, entitled "A MECHANISM FOR OPENING A CLOSURE" and is incorporated by reference herein.

TECHNICAL FIELD

The present invention relates generally to a mechanism for operating a pivoted closure on a vehicle body, and more particularly to a mechanism for operating tailgates, trunk lids, and hoods.

BACKGROUND

An actuator assembly for opening and closing a tailgate is disclosed in U.S. Pat. No. 6,516,567. The actuator assembly includes an actuator rod that reciprocates in a linear direction perpendicular to the pivoting axis of the tailgate. However, this construction may not be easily packaged within some vehicles.

It is therefore desirable to provide an actuator assembly that alters the direction of force of the actuator rod to the required direction for opening and closing the tailgate within various packaging restraints.

SUMMARY OF THE INVENTION

An actuator assembly for pivotally moving a closure includes an actuator, a first bar, a second bar, and an operating strut. The actuator includes an actuator rod that is reciprocable along a longitudinal axis. The first bar has one end pivotally connected via a first pin to the actuator rod and the other end pivotally connected via a second pivot to the operating strut. The second bar has one end pivoted relative to an actuator body of the actuator and the other end pivotally connected via a fourth pivot to the first bar, between the first pivot and second pivot. The four pivots have substantially parallel axes that are orthogonal to the longitudinal axis of the actuator. In this way, linear movement of the actuator rod induces a scissor movement of the first and second bars, resulting in the operating strut moving in a required direction.

One advantage of the invention is that an actuator assembly is provided that alters the direction of force of the actuator rod to a required direction for opening and closing the tailgate within various packaging restraints.

Another advantage of the invention is that an actuator is provided that can be incorporated within existing vehicle platforms.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
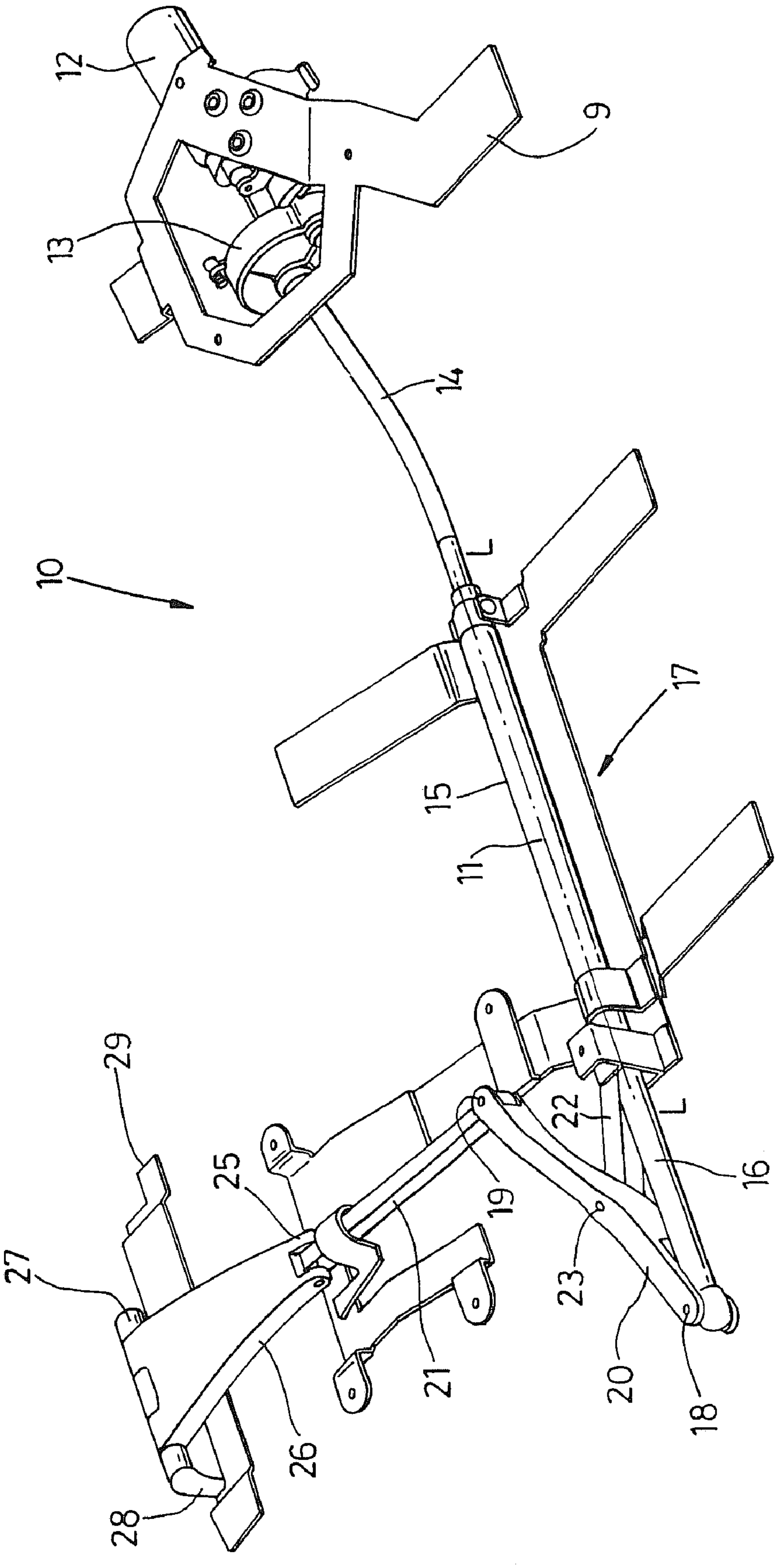
FIG. 1 is an isometric view of an actuator assembly, according to one embodiment of the invention.

In the following figures, the same reference numerals are used to identify the same components in the various views.

Referring to FIG. 1, an actuator assembly 10 includes a suitable power actuator 11, for example a hydraulic, pneumatic or electrically driven actuator. In the present example, the actuator 11 is powered by a DC electric motor 12 via a gearbox 13 and a flexible cable 14. The motor 12 and gearbox 13 are mounted to a bracket 9 for securing to a vehicle body. The cable 14 is formed from an outer sheath with a rotatable inner core which engages a screw-threaded nut (not shown) rotatably mounted within a cylindrical actuator body 15. The screw threaded strut is threadably connected to an actuator rod 16 which is reciprocable within the body 15. Rotation of the screw-threaded strut causes the actuator rod 16 to move linearly relative to the body 15, contracting inwardly or extending outwardly of the body depending upon the direction of rotation of the screw-strut (not shown).

The actuator body 15 is securely mounted on a bracket 17 for attaching to a desired portion of a vehicle body and determining the direction of the linear movement of the actuator rod 16 for the desired end use, for example opening and closing a closure 29. Examples of closures 29 include a tailgate and a liftgate. The present invention is concerned with the conversion of the linear motion of the actuator rod 16 from movement along the longitudinal axis L-L of the actuator 11 to a linear motion along another axial direction, which in the present example is normal to the longitudinal axis L-L.

The outer end of the rod 16 is connected to one end of a first bar 20 via a first pin 18, with the other end of first bar 20 pivotally connected to one end of a strut 21 by a second pivot pin 19. A second bar 22 is pivoted at one end to the bracket 17 via a third pin 24 (shown in FIG. 2) for pivotal movement relative to the actuator body 15. Second bar 22 is pivoted at its other end to the first bar 20 by fourth pivot pin 23 at a location between first and second pivots 18 and 19. The first bar 20 may be straight or otherwise shaped as desired. For instance, first bar 20 can be kinked with the second pivot 19 offset from the line interconnecting the first and fourth pivots 18 and 23. The strut 21 is slidably supported on the bracket 17 and is connected at its other end by a pivot end to link 26. The pivot 25 has its axis of rotation substantially normal to the axis of the pivot 19 and the link 26 is pivotally connected by pivot 27 to an anchor point 28 or shackle mounted on the closure 29, in this case a tailgate.

Referring now to FIGS. 2 through 6, the tailgate 29 is mounted for rotation relative to a vehicle body opening, by hinges 31 which in this case are fixed to the vehicle roof 32. In the illustrated embodiment, the vehicle body opening is defined in part by rear roof bow 34. The actuator 11 extends transversely across the vehicle and is attached by bracket 17 to the vehicle roof between a rear roof header 33 and the rear roof bow 34. The shackle 28 is mounted to an upper portion of the tailgate. In use, the actuator assembly 10 will operate in conjunction with a pair of gas struts or springs (not shown) which are provided on opposite sides of tailgate 29 in a well known manner which is fully described in U.S. Pat. No. 6,516,567. The gas struts assist in manual operation of the tailgate 29 and support tailgate 29 in an open position. One or more actuator assemblies 29 will operate in conjunction with gas struts.

Figure 2:
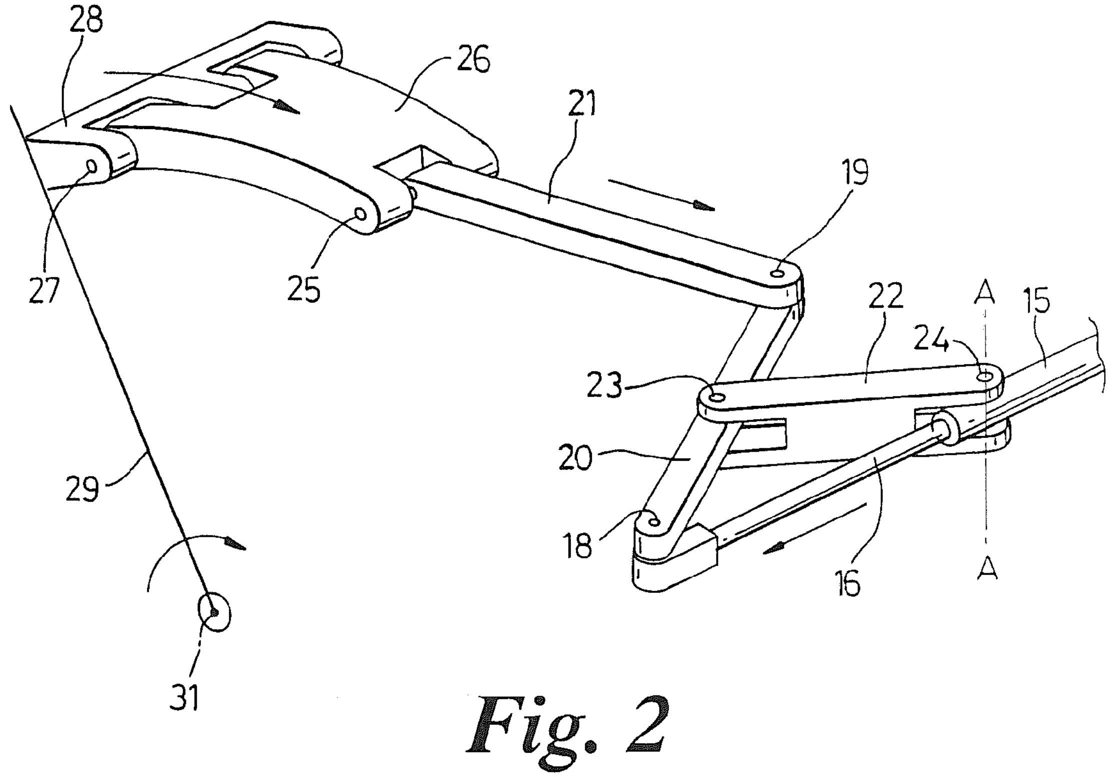
FIG. 2 is a schematic drawing in isometric view of part of the actuator assembly shown in FIG. 1, illustrating the actuator in an extended condition with a vehicle tailgate in a closed position.
Figure 3:
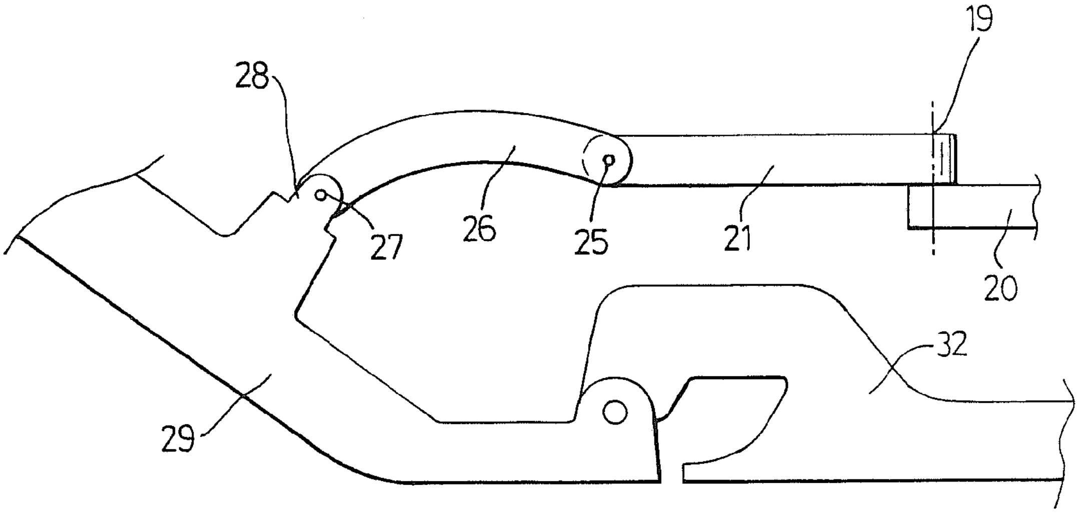
FIG. 3 is a schematic side elevation of the assembly as shown in FIG. 2.

In FIGS. 2 and 3, the tailgate 29 is moved to a closed position with the actuator rod 16 and the pivot 18 fully spaced from the fixed pivot 24 on the actuator body 15. The pivot 19 is at its inner position, which is displaced inwardly from the vehicle opening, and the strut 21 holds the link 26 in a "tailgate closed position."

Figure 4:
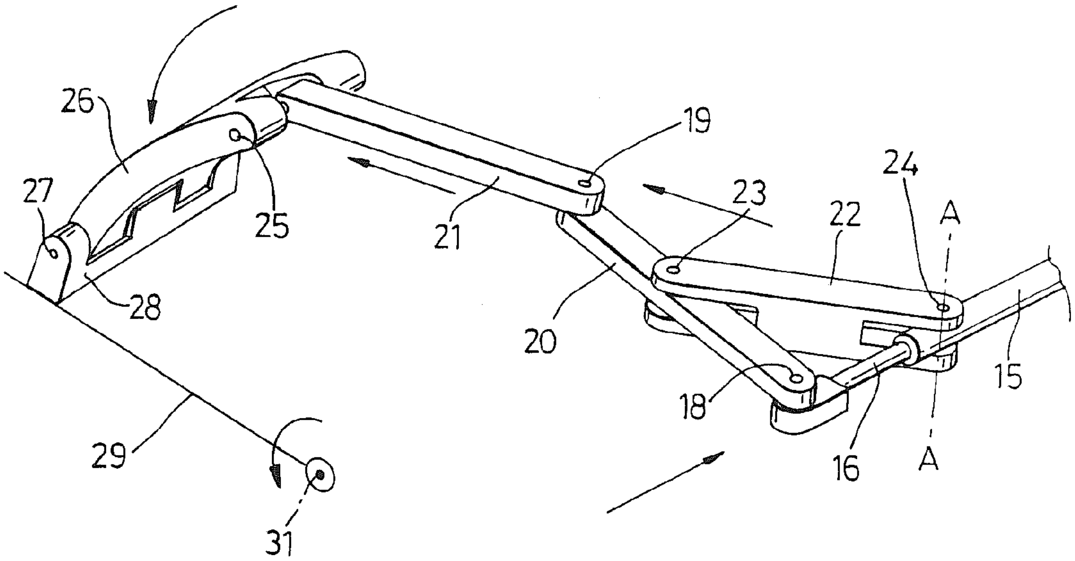
FIG. 4 is a schematic drawing in isometric view of part of the actuator assembly shown in FIG. 1, illustrating the actuator in a contracted condition with the tailgate in an open position.
Figure 5:
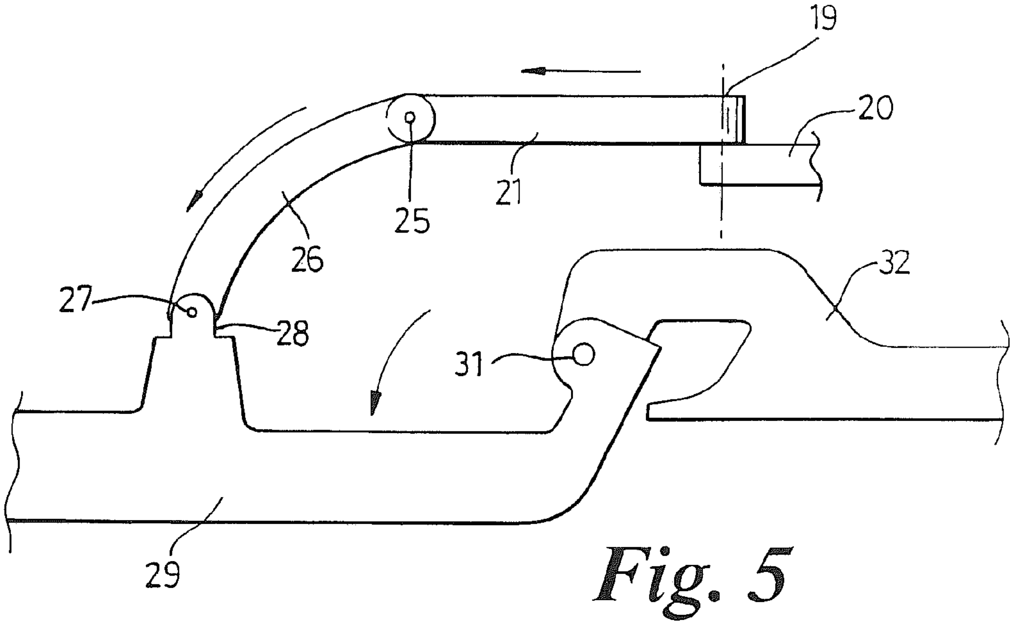
FIG. 5 is a schematic side elevation of the assembly shown in FIG. 4.
Figure 6:
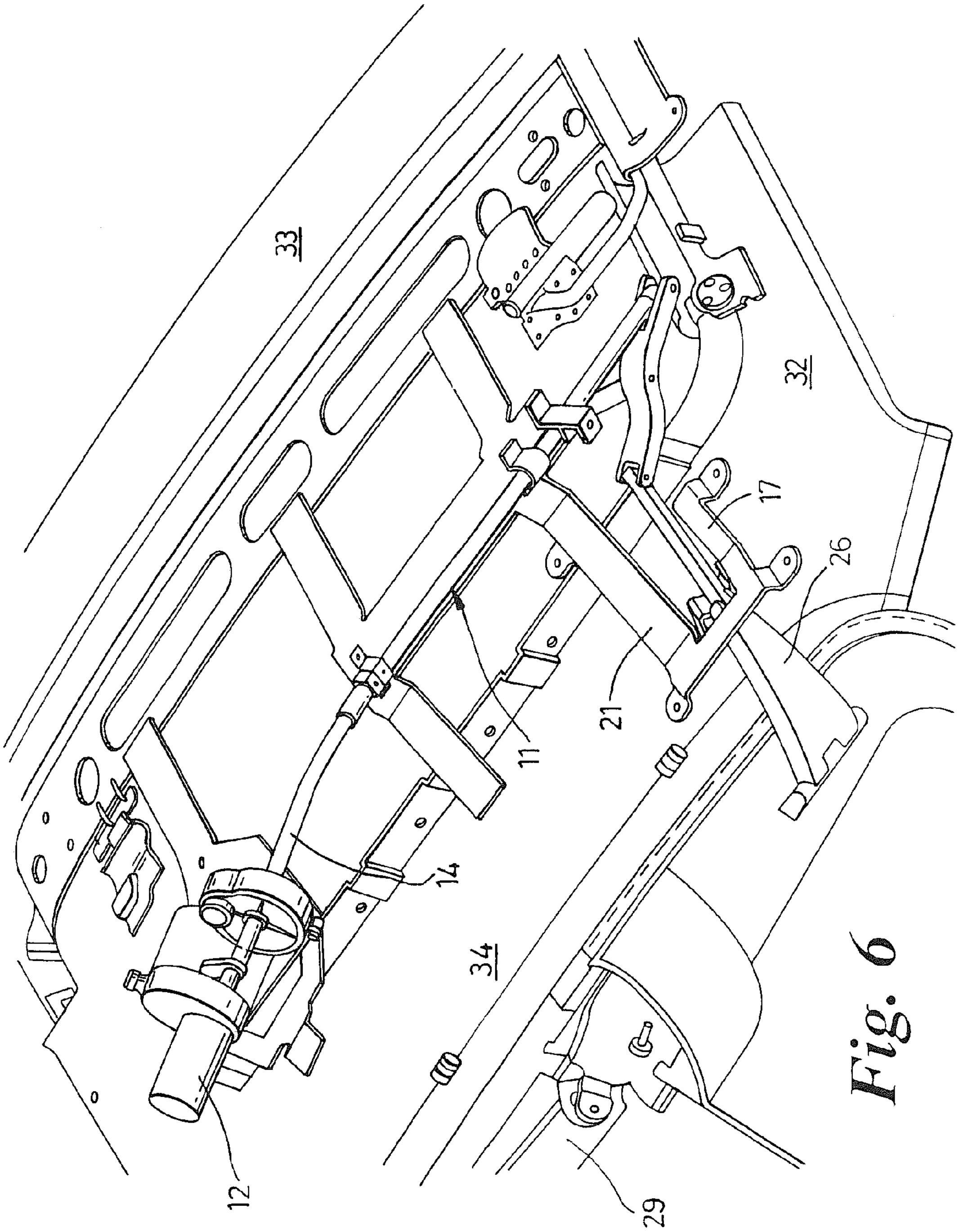
FIG. 6 is an isometric view of the actuator assembly installed in a vehicle roof.

Referring now to FIGS. 4 and 5, in order to open tailgate 29, the actuator 11 is operated to retract the rod 16 into the actuator body 15 and move the pivot 18 toward the fixed pivot 24 on the actuator body 15. The linear movement induces relative rotational scissor movement between the bars 20, 22, resulting in a linear backwards (relative to the vehicle) movement of the strut 21 via pivot 19. Movement of the actuator rod 16 induces a scissor action between the first and second bars 20, 22, causing the pivot 19 at the other end of the first bar 20 to move in a predetermined locus.

As best shown in FIG. 2, the pivot pin 23 is located substantially mid-way between the pins 18 and 19, and the axis A-A of the pivot 24 is normal to and intersects with the longitudinal axis of the actuator 11. In this arrangement, the scissor action between the two bars 20, 22 causes the pivot 19 to move outwards along a path substantially normal to the axis of the actuator 11. The rotational axes of all the pivots 18, 19, 23, 24 are all substantially parallel to each other, with the pivots moving in a plane substantially normal to the axes. The resultant movement of pivot 19 pushes the strut 21 and link 26 backwards. This movement can cause an initial lifting action on a liftgate, with gas struts further assisting in opening the liftgate.

From the fully open position shown in FIGS. 4 and 5, the reverse actuation of the actuator 11 causes the actuator rod 16 to extend and this in turn pulls the tailgate 29 closed against the load in the gas springs. The strut 21 is pulled forwards (that is of the vehicle) and the tailgate is moved to the closed position. It is understood that the closure of a liftgate is assisted by gravity.

The locus of the pivot 19 and hence the direction of the load exerted by the actuator 11 may be altered to bias either side of the normal locating the pivot pin 23 away from the midpoint of the first bar 20. The locus may additionally or alternatively be varied by offsetting the pivot 18 from the longitudinal axis of the actuator 11. By selection of the location of the pivots 23, 24, it is possible to make the pivot 19 move along desired paths to exert a load in a required direction.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An actuator assembly for pivotal movement of a closure, comprising:
- an actuator having an actuator body and an actuator rod reciprocable within said actuator body along a longitudinal axis;
- an operating strut operably connected to a closure;
- a first bar;
- said first bar with one end connected via a first pivot to an outer end of said actuator rod and the other end connected via a second pivot to said operating strut; and
- a second bar pivoted at one end relative to said actuator body by a third pivot and the other end connected to said first bar by a fourth pivot;
- said fourth pivot located between said first pivot and said second pivot;
- said first pivot, said second pivot, said third pivot and said fourth pivot having a plurality of substantially parallel axes that are orthogonal to said longitudinal axis of said actuator rod such that linear movement of said actuator rod induces a scissor movement between said first bar and said second bar resulting in said operating strut moving in a required direction.

2. The actuator assembly of claim 1, wherein said linear movement of said actuator rod is converted into movement of the operating strut in a direction substantially normal to said linear movement of said actuator rod, with said fourth pivot located substantially at the midpoint between said first pivot and said second pivot and the third pivot located on an axis normal to and intersecting with said longitudinal axis of said actuator rod.

3. The actuator assembly of claim 1, wherein said first bar is kinked with said second pivot offset from a line interconnecting said first pivot and fourth pivot.

4. The actuator assembly of claim 1 further including a bracket with said actuator body, said third pivot, and said operating strut mounted on said bracket.

5. An actuator assembly for pivotal movement of a closure, comprising:
- an actuator having an actuator body and an actuator rod reciprocable along a longitudinal axis within said actuator body;
- an operating strut operably connected to a closure;
- a first bar;
- said first bar with one end pivotally attached to said actuator rod and the other end pivotally connected to said operating strut; and
- a second bar with at one end pivotally connected to said actuator body and the other end pivotally connected to a midpoint of said first bar;
- said actuator rod moving in a linear direction and inducing a scissor movement between said first bar and said second bar so as to move said operating strut in a required direction.

6. The actuator assembly of claim 5 wherein said operating strut is movable in a direction substantially normal to said longitudinal axis of said actuator rod.

7. The actuator assembly of claim 5 wherein said second bar is pivotally attached to said actuator body relative to an axis that is normal to and intersecting said longitudinal axis of said actuator rod.

8. The actuator assembly of claim 5 wherein said operating strut is pivotally attached to said closure relative to an axis that is parallel to said longitudinal axis of said actuator rod.

9. The actuator assembly of claim 5 wherein said first bar has a kinked construction.

10. The actuator assembly of claim 5 further including a bracket with said actuator body and said operating strut mounted thereon.

11. An actuator assembly for pivotal movement of a closure, comprising:
- an actuator having an actuator body and an actuator rod reciprocable along a longitudinal axis within said actuator body;

an operating strut operably connected to a closure;

a two-bar scissor assembly pivotally connected between said actuator rod and said operating strut;

said actuator rod moving in a linear direction and inducing said operating strut to move in a required direction.

12. The actuator assembly of claim 11 wherein said two-bar scissor assembly comprises:

a first bar with one end pivotally attached to said actuator rod and the other end pivotally connected to said operating strut; and a second bar with at one end pivotally connected to said actuator body and the other end pivotally connected to a midpoint of said first bar.

13. The actuator assembly of claim 12 wherein said second bar is pivotally attached to said actuator body relative to an axis that is normal to and intersecting said longitudinal axis of said actuator rod.

14. The actuator assembly of claim 11 wherein said operating strut is pivotally attached to said closure relative to an axis that is parallel to said longitudinal axis of said actuator rod.

15. The actuator assembly of claim 11 wherein said operating strut is movable in a direction substantially normal to said longitudinal axis of said actuator rod.

* * * * *